(12) United States Patent
Schrell

(10) Patent No.: US 10,184,426 B2
(45) Date of Patent: Jan. 22, 2019

(54) THRUST REVERSER WITH FORWARD POSITIONED BLOCKER DOORS

(71) Applicant: Rohr, Inc., Chula Vista, CA (US)

(72) Inventor: Johann S. Schrell, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 295 days.

(21) Appl. No.: 14/746,380

(22) Filed: Jun. 22, 2015

(65) Prior Publication Data

US 2016/0369743 A1    Dec. 22, 2016

(51) Int. Cl.
| | |
|---|---|
| *F02K 1/62* | (2006.01) |
| *F02K 1/72* | (2006.01) |
| *F02K 1/52* | (2006.01) |
| *F02K 1/68* | (2006.01) |
| *F02K 1/70* | (2006.01) |
| *F02K 1/80* | (2006.01) |

(52) U.S. Cl.
CPC .............. *F02K 1/625* (2013.01); *F02K 1/70* (2013.01); *F02K 1/72* (2013.01); *F02K 1/805* (2013.01); *F02K 1/52* (2013.01); *F02K 1/68* (2013.01)

(58) Field of Classification Search
CPC ... F02K 1/625; F02K 1/72; F02K 1/52; F02K 1/605; F02K 1/566; F02K 1/763; F02K 1/766; F02K 1/80; F02K 1/805; F02K 1/62; F02K 1/64; F02K 1/68; F02K 1/70; F02K 1/56
See application file for complete search history.

(56) References Cited

U.S. PATENT DOCUMENTS

| | | | | |
|---|---|---|---|---|
| 4,026,105 | A | * | 5/1977 | James ................. F02K 1/64 239/265.29 |
| 5,927,647 | A | | 7/1999 | Masters et al. |
| 7,866,142 | B2 | | 1/2011 | Beardsley et al. |
| 8,316,632 | B2 | | 11/2012 | West et al. |
| 9,410,500 | B2 | * | 8/2016 | Caruel ................. F02K 1/09 |
| 2004/0068978 | A1 | * | 4/2004 | Lair ..................... F02K 1/70 60/226.2 |
| 2011/0174899 | A1 | * | 7/2011 | Vauchel .............. B64D 29/06 239/265.11 |
| 2012/0067024 | A1 | * | 3/2012 | Vauchel .............. F02K 1/72 60/226.2 |
| 2012/0079805 | A1 | * | 4/2012 | Stuart ................. F02K 1/72 60/226.2 |
| 2013/0075493 | A1 | * | 3/2013 | Vauchel ............ F01D 11/005 239/265.19 |
| 2013/0126638 | A1 | * | 5/2013 | Vauchel .............. F02K 1/72 239/265.19 |

(Continued)

*Primary Examiner* — Arun Goyal
*Assistant Examiner* — Stephanie Cheng
(74) *Attorney, Agent, or Firm* — O'Shea Getz P.C.

(57) ABSTRACT

An assembly is provided for an aircraft propulsion system. This assembly includes a thrust reverser cascade, a fan ramp fairing and a blocker door. The thrust reverser cascade extends along an axial centerline from a forward cascade end to an aft cascade end. The fan ramp fairing is disposed at the forward cascade end. The fan ramp fairing is configured with a fairing surface that provides a forward boundary for bypass air flowing into the thrust reverser cascade during a first mode of operation. The blocker door is configured to completely axially overlap the fairing surface during a second mode of operation.

12 Claims, 10 Drawing Sheets

(56) References Cited

U.S. PATENT DOCUMENTS

| | | | |
|---|---|---|---|
| 2014/0319243 A1* | 10/2014 | Caruel | F02K 1/09 239/265.19 |
| 2015/0285185 A1* | 10/2015 | Caruel | F02K 1/72 415/146 |
| 2016/0003190 A1* | 1/2016 | Weiner | F02K 1/15 239/265.33 |
| 2016/0245230 A1* | 8/2016 | Todorovic | F02C 3/04 |

* cited by examiner

THRUST REVERSER WITH FORWARD POSITIONED BLOCKER DOORS

BACKGROUND OF THE INVENTION

1. Technical Field

This disclosure relates generally to an aircraft propulsion system and, more particularly, to a thrust reverser with blocker doors.

2. Background Information

A typical propulsion system for an aircraft includes a thrust reverser for providing reverse thrust. Various types and configurations of thrust reversers are known in the art. While these thrust reversers have various advantages, there is still a need in the art for an improved thrust reverser for an aircraft propulsion system. In particular, there is a need for a thrust reverser with reduced drag during normal forward flight of the aircraft.

SUMMARY OF THE DISCLOSURE

According to an aspect of the present disclosure, an assembly is provided for an aircraft propulsion system. This assembly includes a thrust reverser cascade, a fan ramp fairing and a blocker door. The thrust reverser cascade extends along an axial centerline from a forward cascade end to an aft cascade end. The fan ramp fairing is disposed at the forward cascade end. The fan ramp fairing is configured with a fairing surface that provides a forward boundary for bypass air flowing into the thrust reverser cascade during a first mode of operation. The blocker door is configured to completely axially overlap the fairing surface during a second mode of operation.

According to another aspect of the present disclosure, another assembly is provided for an aircraft propulsion system. This assembly includes a thrust reverser cascade, a translating sleeve, a fan ramp fairing and a blocker door. The thrust reverser cascade extends along an axial centerline from a forward cascade end to an aft cascade end. The translating sleeve is configured to axially translate relative to the thrust reverser cascade. The fan ramp fairing is disposed at the forward cascade end. The fan ramp fairing is configured to provide a forward boundary for air flowing into the thrust reverser cascade where the translating sleeve is deployed. The blocker door is attached to the translating sleeve. The blocker door is configured to completely axially cover the fan ramp fairing where the translating sleeve is stowed.

According to still another aspect of the present disclosure, another assembly is provided for an aircraft propulsion system. This assembly includes a fan case, a thrust reverser cascade, a fan ramp fairing and a blocker door. The fan case extends along an axial centerline from a forward case end to an aft case end. The thrust reverser cascade extends axially from a forward cascade end to an aft cascade end. The fan ramp fairing extends between the aft case end and the forward cascade end. The blocker door is configured to axially abut against the fan case and block air flow to the thrust reverser cascade during a mode of operation.

The blocker door may be configured to project axially forward of the fan ramp fairing during the second mode of operation.

The fairing surface may extend circumferentially about the centerline. The fairing surface may flare radially outward as the fan ramp fairing extends aft along the centerline.

The fan ramp fairing may have an arcuate sectional geometry.

A hinge may be included and mounted to the blocker door. The hinge may project into a pocket formed in the fan ramp fairing.

A fan case may be included and extend axially to an aft case end. A first end of the blocker door may be substantially axially coincident with the aft case end.

A fan case may be included. The blocker door may be configured to partially axially overlap the fan case during the second mode of operation.

A fan case may be included. The fan ramp fairing may extend between the fan case and the thrust reverser cascade.

A translating sleeve may be included and configured to axially translate relative to the thrust reverser cascade. The blocker door may be pivotally attached to the translating sleeve.

The blocker door may be pivotally attached to the translating sleeve at a first end of the blocker door. The blocker door may be configured to axially overlap the fan ramp fairing and/or the fairing surface at the first end.

The blocker door may be configured to provide an aft boundary for bypass air flowing into the thrust reverser cascade during the first mode of operation.

The blocker door may be configured to completely axially cover a fairing surface of the fan ramp fairing during the mode of operation. The fairing surface may be configured to provide a forward boundary for bypass air flowing into the thrust reverser cascade during another mode of operation.

A translating sleeve may be included and configured to axially translate relative to the thrust reverser cascade. The blocker door may be pivotally attached to the translating sleeve at a first end of the blocker door. The blocker door may be configured to project axially forward of the fan ramp fairing to the first end during the second mode of operation.

The foregoing features and the operation of the invention will become more apparent n light of the following description and the accompanying drawings.

DETAILED DESCRIPTION OF THE INVENTION

Figure 1:
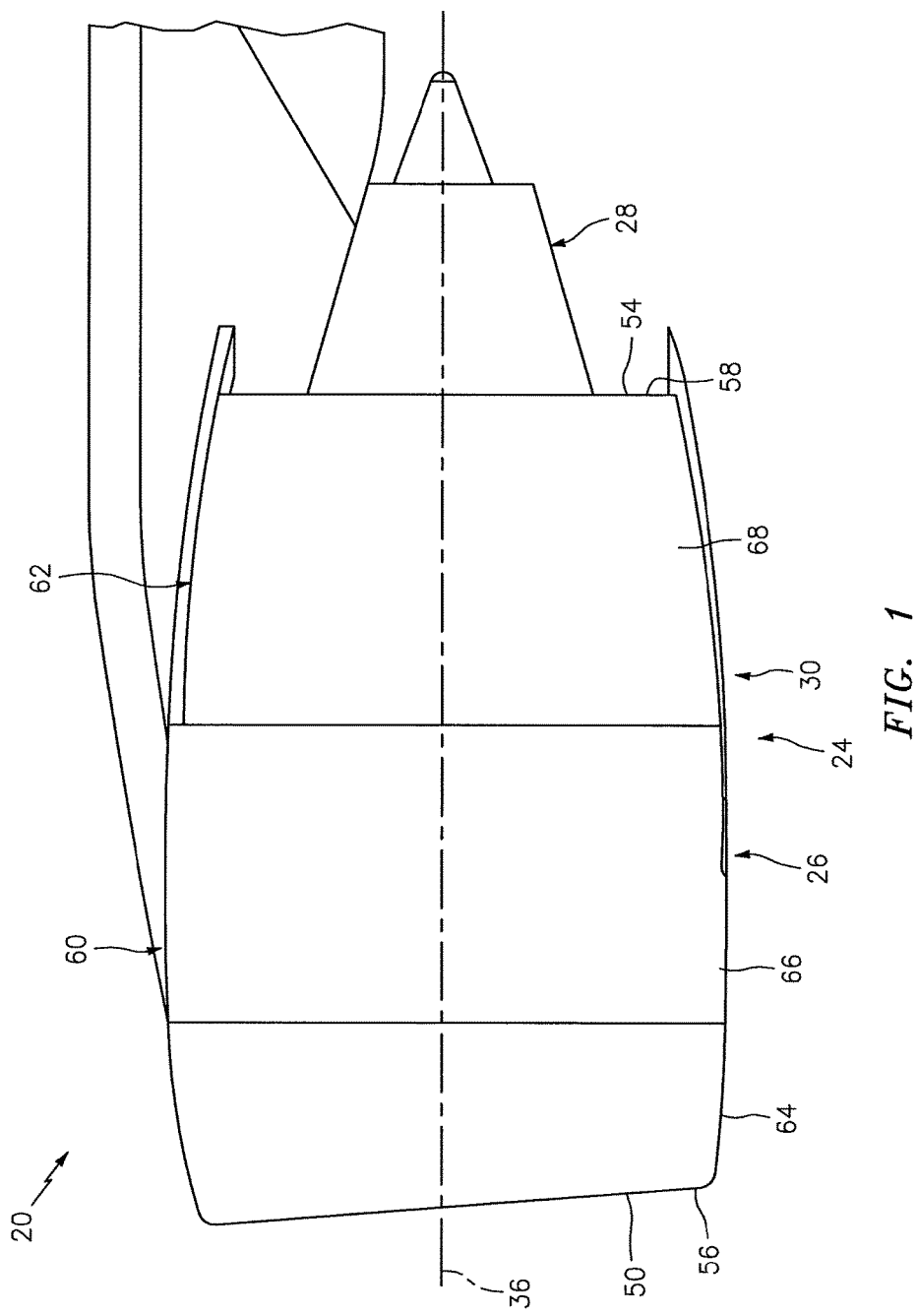
FIG. 1 is side illustration of an aircraft propulsion system.
Figure 2:
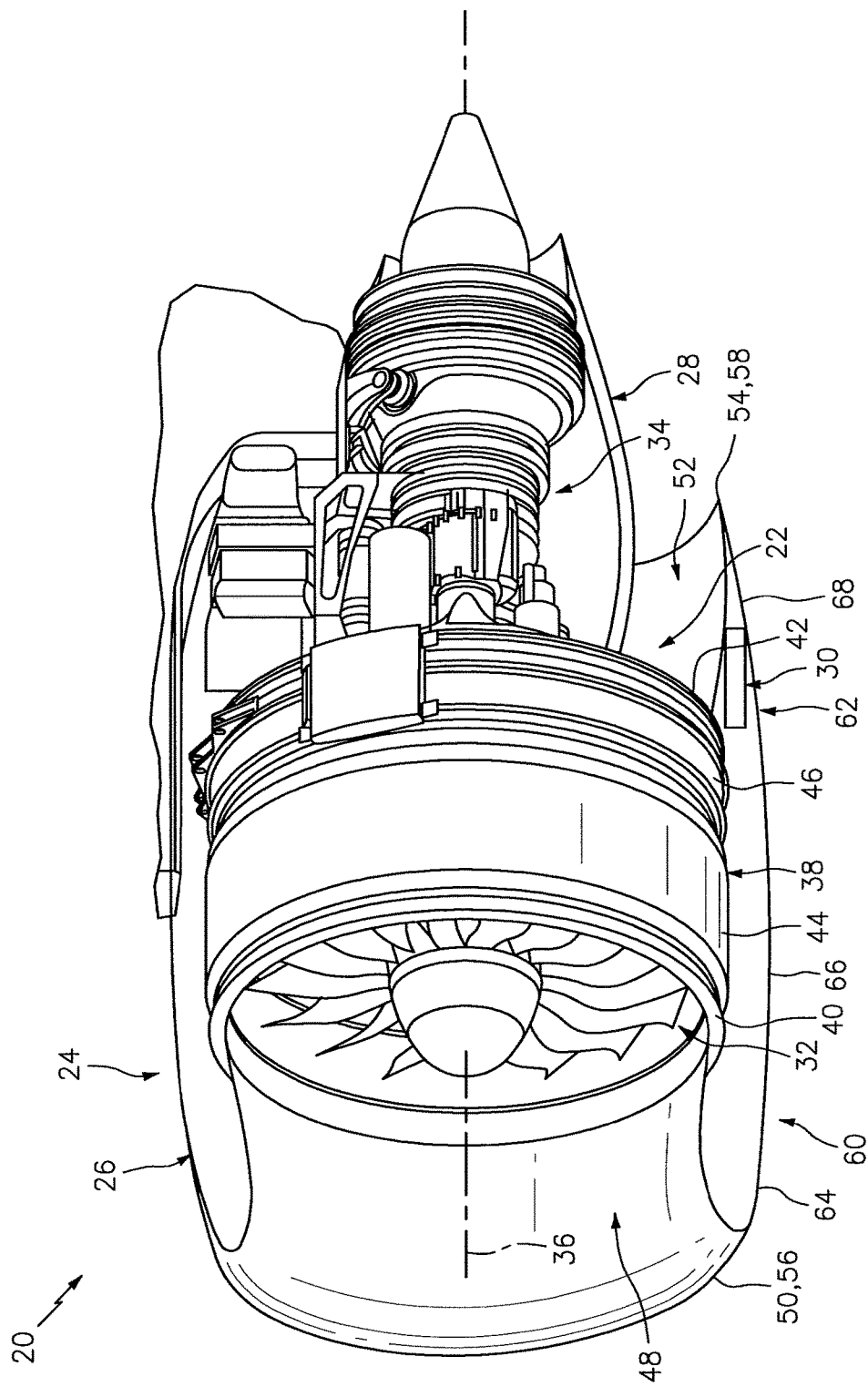
FIG. 2 is a side cutaway illustration of the aircraft propulsion system.

FIGS. 1 and 2 illustrate an aircraft propulsion system 20 for an aircraft such as, but not limited to, an airplane or a jet plane. This propulsion system 20 includes a gas turbine engine 22 housed within nacelle 24, which includes an outer structural fairing assembly 26 (e.g., an inlet, a fan cowl and a thrust reverser translating sleeve) and an inner fairing assembly 28 (e.g., an inner fixed structure). The propulsion system 20 also includes a thrust reverser 30 configured with the outer structural fairing assembly 26.

The turbine engine 22 may be configured as a turbofan engine. The turbine engine 22 of FIG. 2, for example, includes a hi-bypass fan section 32 and an engine core 34. This engine core 34 may include a low pressure compressor (LPC) section, a high pressure compressor (HPC) section, a combustor section, a high pressure turbine (RFD section and a low pressure turbine (LPT) section sequentially arranged along an axial centerline 36 of the propulsion system 20.

The fan section 32 includes a fan rotor configured with an array of fan blades. These fan blades are housed within a fan case 38. This fan case 38 extends axially from a forward case end 40 to an aft case end 42. The fan case 38 may include a forward segment 44 or portion at the forward case end 40 and an aft segment 46 or portion at the aft case end 42. The fan case 38 may also include one or more liners which line an interior of the segments 44 and 46 and/or portions.

The forward segment 44 or portion is configured as and hereinafter referred to as a fan containment case. This containment case 44 is configured to provide an outer boundary for an axial portion of a gas path 48 (e.g., an inlet/fan duct) extending axially into the propulsion system 20 from an inlet orifice 50. The containment case 44 may also be configured to radially contain one or more of the fan blades and/or fan blade fragments where the blade(s) and/or blade fragment(s) are radially ejected from the fan rotor, for example, after collision with a foreign object. The aft segment 46 or portion is configured to provide an outer boundary for an axial portion of another gas path 52 (e.g., a bypass gas path), which is fluidly coupled with and aft of the gas path 48. The gas path 52 extends axially from the gas path 48, through the propulsion system 20, to a bypass exhaust nozzle 54. Of course, various fan and containment case types and configurations are known in the art, and the present disclosure is not limited to any particular ones thereof.

Referring again to FIGS. 1 and 2, the outer structural fairing assembly 26 extends axially along the centerline 36 between a forward fairing end 56 and an aft fairing end 58. The outer structural fairing assembly 26 includes a stationary forward nacelle segment 60 and an aft nacelle segment 62.

The forward nacelle segment 60 may include a nacelle inlet 64 and a fan cowling 66. The nacelle inlet 64 is disposed at the forward nacelle end 56. The nacelle inlet 64 is configured to direct a stream of air through the inlet orifice 50 and into the turbine engine 22. The fan cowling 66 is disposed axially between the nacelle inlet 64 and the aft nacelle segment 62. More particularly, the fan cowling 66 is generally axially aligned with the fan section 32 and is configured to provide an aerodynamic covering for the fan case 38.

The aft nacelle segment 62 is disposed at the aft nacelle end 58. The aft nacelle segment 62 of FIGS. 1 and 2 is configured as a translating sleeve 68. Of course, in some embodiments, the aft nacelle segment 62 may also include one or more additional components such as another translating sleeve. Such an additional translating sleeve may configured the bypass exhaust nozzle 54 as a variable area fan nozzle (VAFN).

Figure 3:
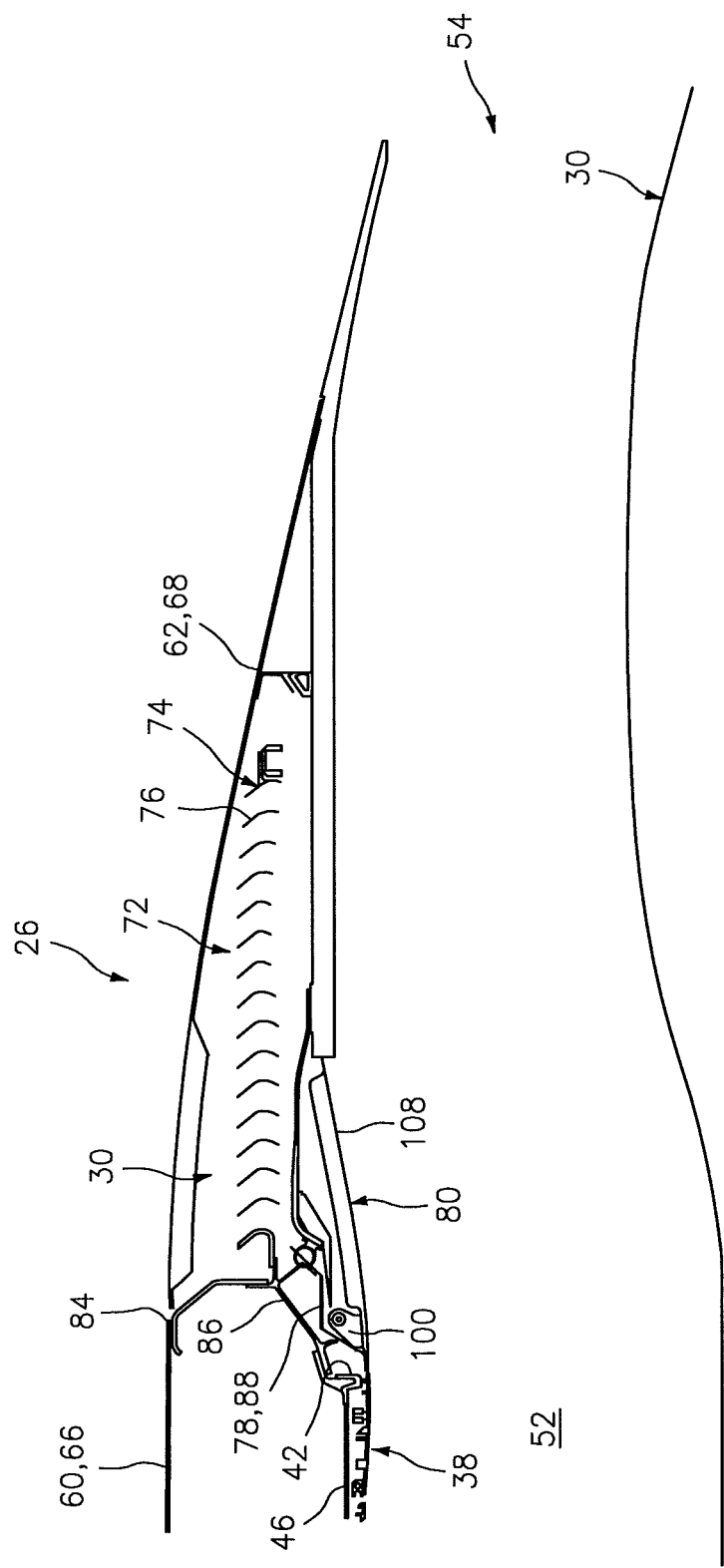
FIG. 3 is a side sectional illustration of a portion of an engine nacelle with a translating sleeve and blocker doors in a stowed position during a mode of operation.
Figure 4:
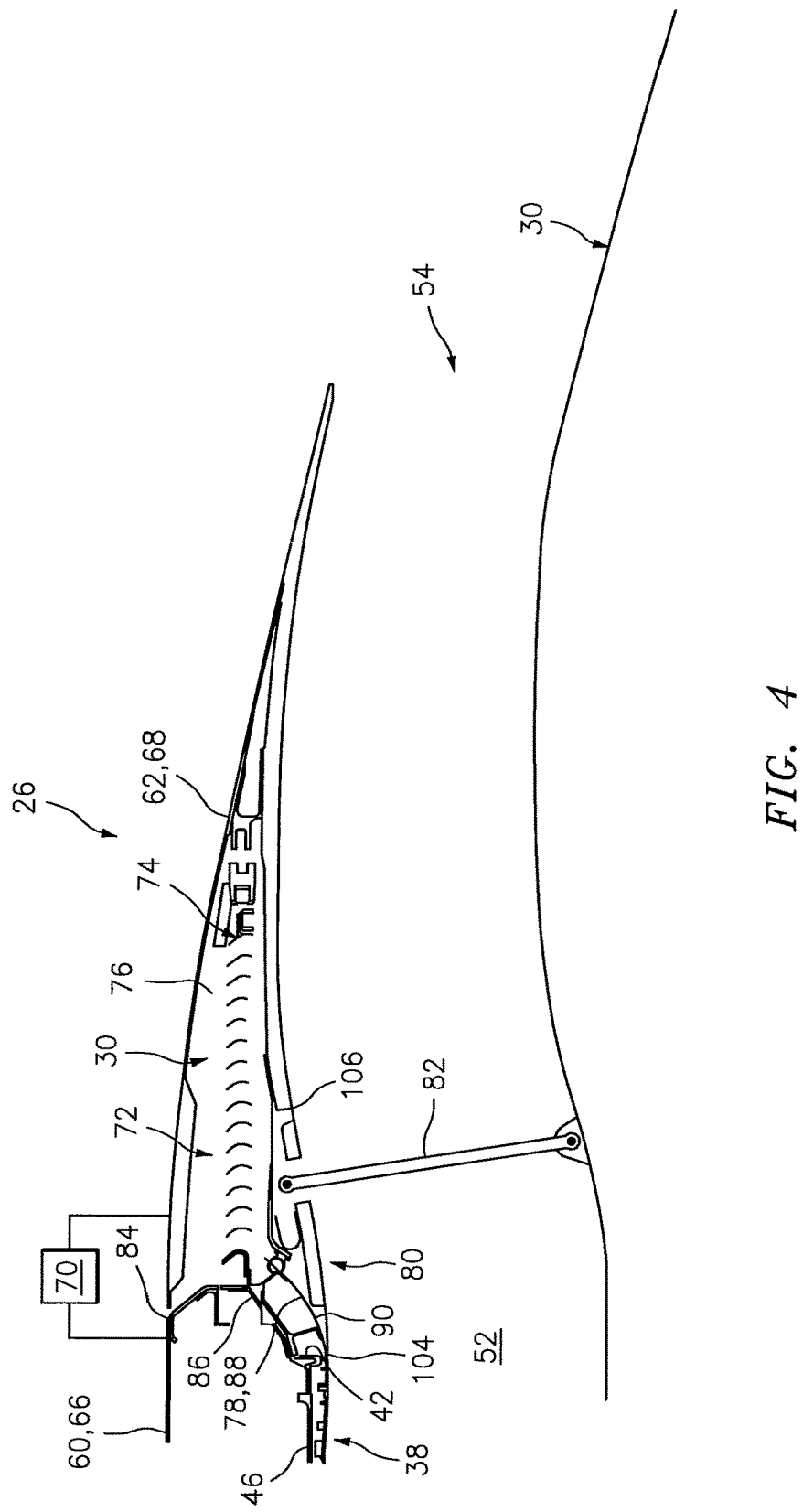
FIG. 4 is another side sectional illustration of the engine nacelle with the translating sleeve and the blocker doors in the stowed position.
Figure 5:
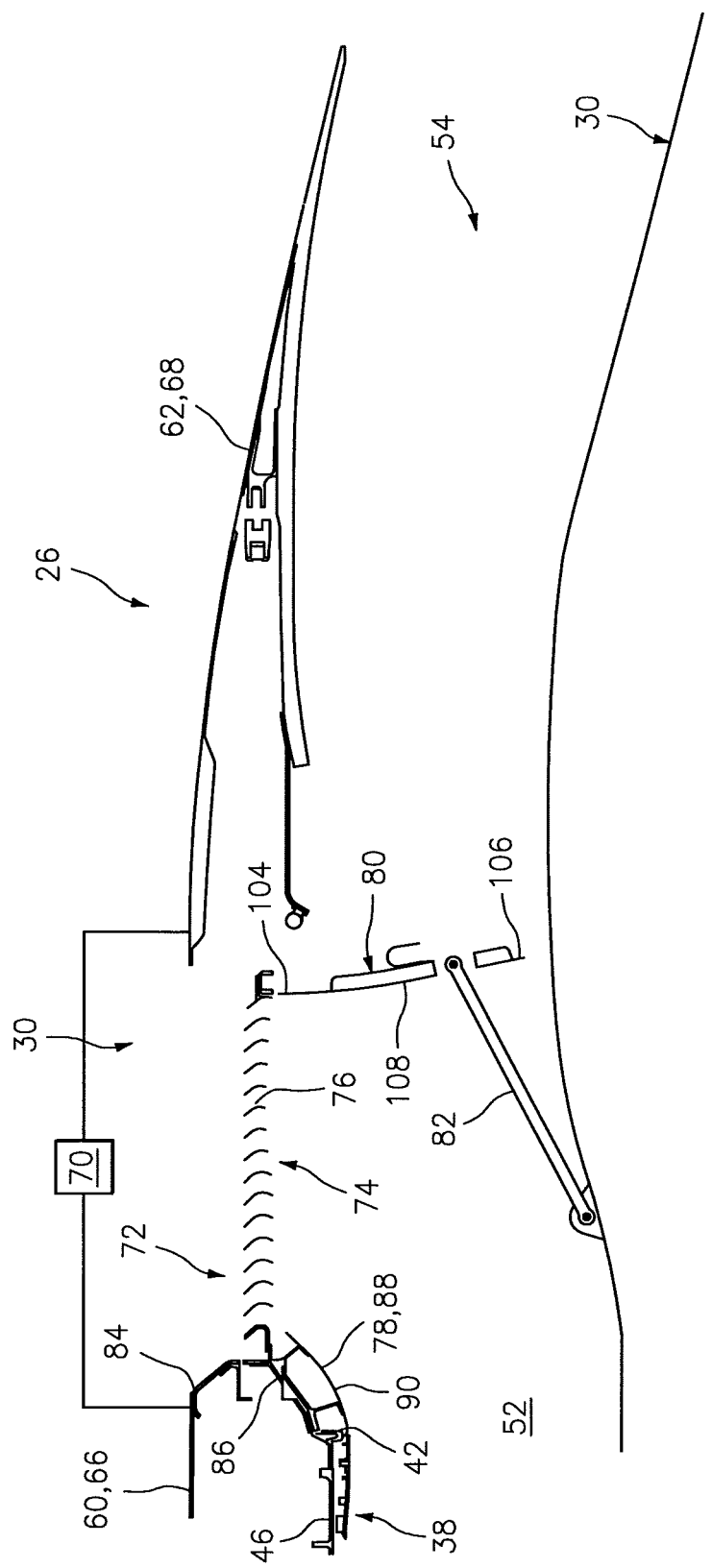
FIG. 5 is a side sectional illustration of the engine nacelle with the translating sleeve and the blocker doors in a deployed position during another mode of operation.

The translating sleeve 68 is configured to provide an outer boundary for another axial portion of the gas path 52. The translating sleeve 68 of FIG. 3 is configured to define the bypass exhaust nozzle 54 with the inner fairing assembly 28. The translating sleeve 68 is also configured to axially translate between a stowed position (see FIG. 4) and a deployed position (see FIG. 5). More particularly, as illustrated in FIGS. 4 and 5, the outer structural fairing assembly 26 is configured with one or more actuators 70 (e.g., hydraulic/pneumatic actuators, or electric motors, etc.) adapted to move the translating sleeve 68 axially along the centerline 36 relative to the forward nacelle segment 60 between the stowed position of FIG. 4 and the deployed position of FIG. 5. In the stowed position of FIG. 4, the translating sleeve 68 closes a passage 72 through the nacelle 26 and the thrust reverser 30. In the deployed position of FIG. 5, the translating sleeve 68 opens the passage 72 through the outer structural fairing assembly 26 and the thrust reverser 30, which enables bypass air from the gas path 52 to flow through the thrust reverser 30 to provide reverser engine thrust.

The translating sleeve 68 may have a substantially tubular unitary sleeve body (e.g., may extend more than 330 degrees around the centerline 36) as generally illustrated in FIG. 2. Alternatively, the translating sleeve 68 may include a pair of sleeve segments (e.g., halves) arranged on opposing sides of the propulsion system 20 as illustrated in FIG. 1. The present disclosure, however, is not limited to the foregoing exemplary translating sleeve configurations.

Referring again to FIGS. 3 to 5, the thrust reverser 30 includes one or more thrust reverser cascades 74 comprising turning vanes 76 and a fan ramp fairing 78. The thrust reverser 30 also includes one or more blocker doors 80 and one or more linkages 82.

The thrust reverser cascades 74 are arranged about the centerline 36 in a circumferential array. The turning vanes 76 in each of the thrust reverser cascades 74 are arranged in a plurality of parallel rows along the centerline 36. The thrust reverser cascades 74 of FIGS. 3 to 5 are fixedly mounted (e.g., mechanically fastened and/or bonded) to a thrust reverser torque box, to which the forward nacelle segment 60 and/or the fan case 38 are also directly or indirectly engaged with generally at (e.g., on, adjacent or proximate) the ends 84 and 42. Where the translating sleeve 68 is in the stowed position of FIG. 4, the thrust reverser cascades 74 are stowed within a cavity within the translating sleeve 68 and inoperative. Where the translating sleeve 68 is in the deployed position of FIG. 5, the thrust reverser cascades 74 are uncovered to provide the passage 72 radially through the thrust reverser 30. The thrust reverser cascades 74 along with the deployed blocker doors 80 are operable to redirect aft flowing bypass air, from the gas path 52 within the outer structural fairing assembly 26, radially out through the passage 72 and thereafter in a generally forward direction to provide reverse thrust.

Figure 6:
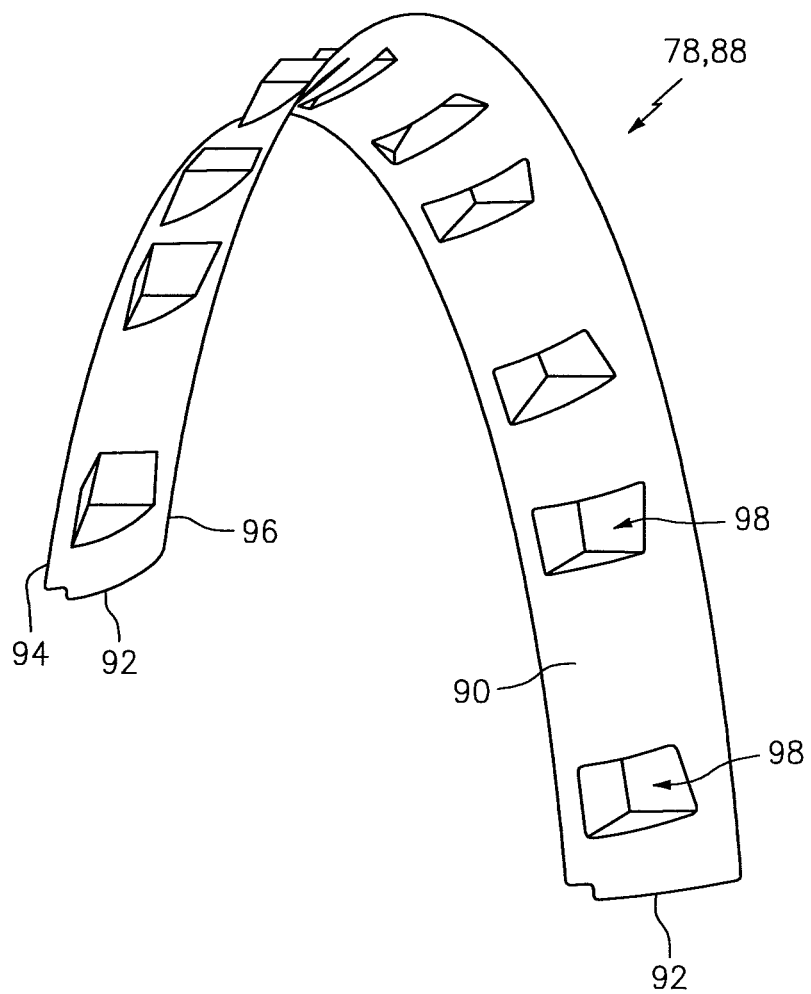
FIG. 6 is a perspective illustration of an arcuate segment of a fan ramp fairing.

The fan ramp fairing 78 is positioned at (e.g., adjacent to) the aft case end 42, for example, in order to form a substantially continuous aero-surface with the fan case 38. The fan ramp fairing 78 may be mounted to an intermediate support structure 86 (e.g., the thrust reverser torque box), which structure 86 is positioned between and may be engaged with the fan case 38 and/or the fan cowling 66. The fin ramp fairing 78 includes a plurality of arcuate segments 88 which are arranged about the centerline 36; however, the fan ramp fairing 78 may alternatively be configured as a unitary, substantially annular body. Referring to FIG. 6, the fairing segment 88 includes an aft fairing surface 90. The fan ramp fairing 78 and its surface 90 extends circumferentially about the centerline 36 between opposing fairing ends 92. The fan ramp fairing 78 and its surface 90 flare radially outward as the fan ramp fairing 78 extends axially from its forward fairing end 94 to its aft fairing end 96. In this manner and as illustrated in FIG. 5, the fan ramp fairing 78 and its surface 90 provide a forward boundary for and are operable to smoothly guide the bypass air flowing from the gas path 52 into the thrust reverser cascades 74 and the passage 72. More particularly, the fan ramp fairing 78 and its surface 90 extend and provide a relatively smooth transition between the fan case 38 and the thrust reverser cascades 74.

Figure 7:
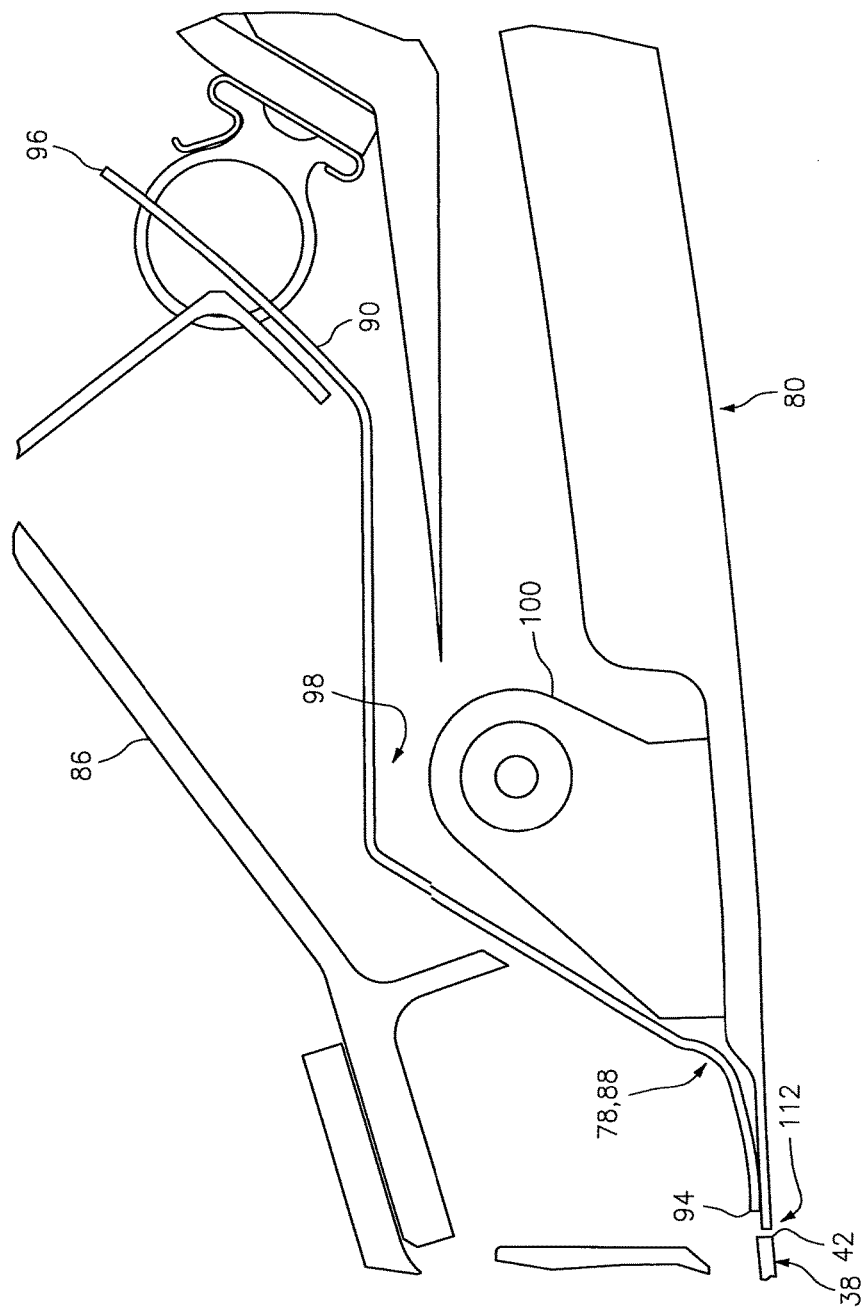
FIG. 7 is a side sectional illustration of another portion of the engine nacelle where a hinge pivotally attaches the blocker door to the translating sleeve.

Referring again to FIG. 6, the fan ramp fairing 78 may include a plurality of pockets 98. Each of these pockets 98 may extend into the fan ramp fairing 78 from the fairing surface 90. As best seen in FIG. 7, the pockets 98 are configured to receive hinges 100 which pivotally attach the blocker doors 80 to the translating sleeve 68. In the embodiment illustrated in FIGS. 6 and 7, the fan ramp fairing 78 is configured such that a single hinge 100 projects into a respective pocket 98. However, in other embodiments, multiple hinges 100 may project into the same pocket 98; e.g., adjacent hinges 100 for adjacent blocker doors 80.

Figure 8:
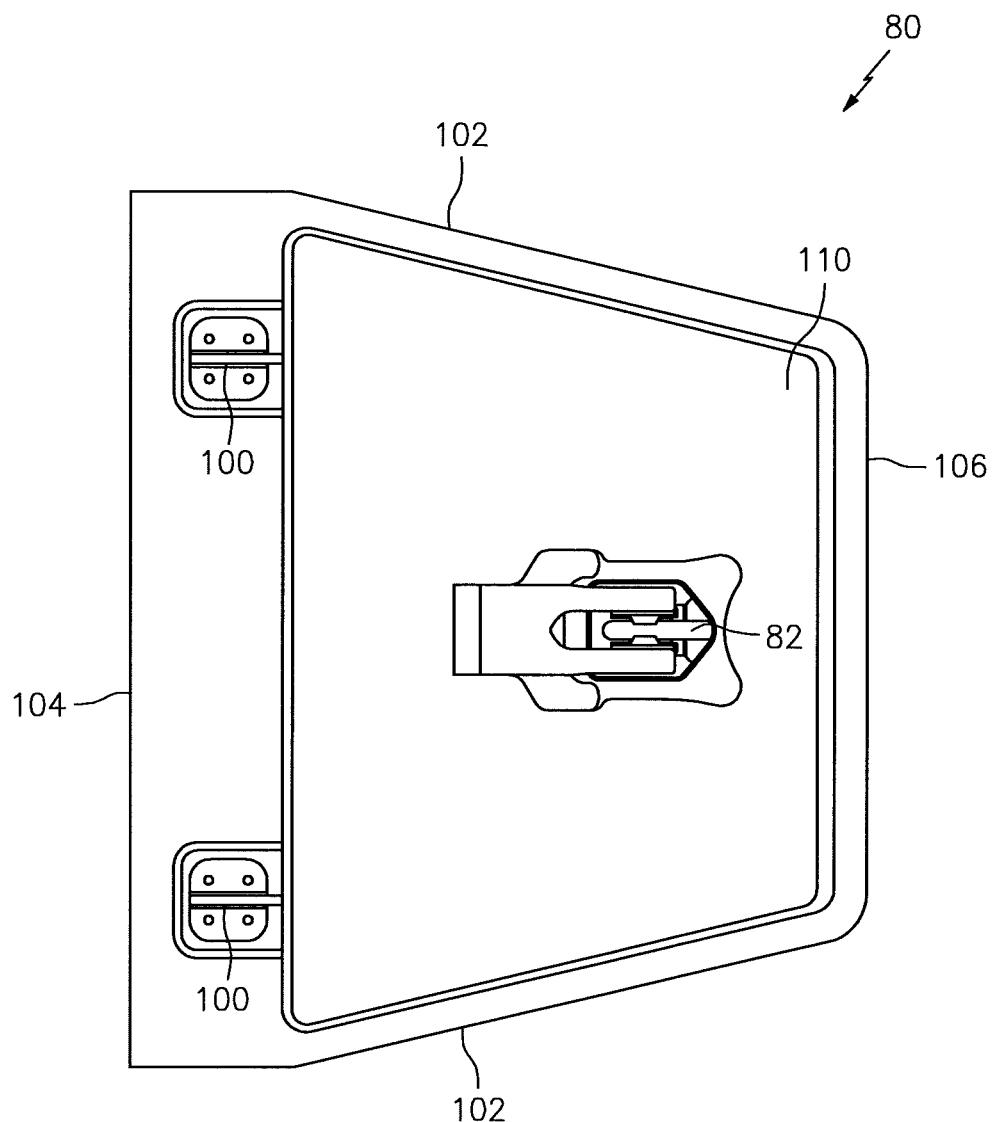
FIG. 8 is a top view illustration of one of the blocker doors.

Referring to FIG. 8, each of the blocker doors 80 extends laterally (e.g., circumferentially) between opposing sides 102. Each of the blocker doors 80 extends longitudinally from a forward door end 104 and an aft door end 106. Each of the blocker doors 80 extends transversely (e.g., radially) between an inner door surface 108 (see FIG. 3) and an outer door surface 110. Here, the terms "forward" and "aft" describe the relative locations of the door ends 104, 106 where the respective blocker door 80 is stowed as illustrated in FIG. 4. The aft door end 106, however, may be located axially forward of the forward door end 104 where the blocker door 80 is deployed beyond the position illustrated in FIG. 5. In addition, the terms "inner" and "outer" describe the relative locations of the door surfaces 108, 110 where the respective blocker door 80 is stowed as illustrated in FIG. 4. The inner door surface 108, however, may be located radially outboard of the outer door surface 110 where the blocker door 80 is deployed beyond the position illustrated in FIG. 5.

The blocker doors 80 are arranged circumferentially around the centerline 36. Referring to FIG. 3, each of the blocker doors 80 is pivotally connected to a forward portion of the translating sleeve 68 by one or more of the hinges 100 (see also FIG. 8).

Figure 9:
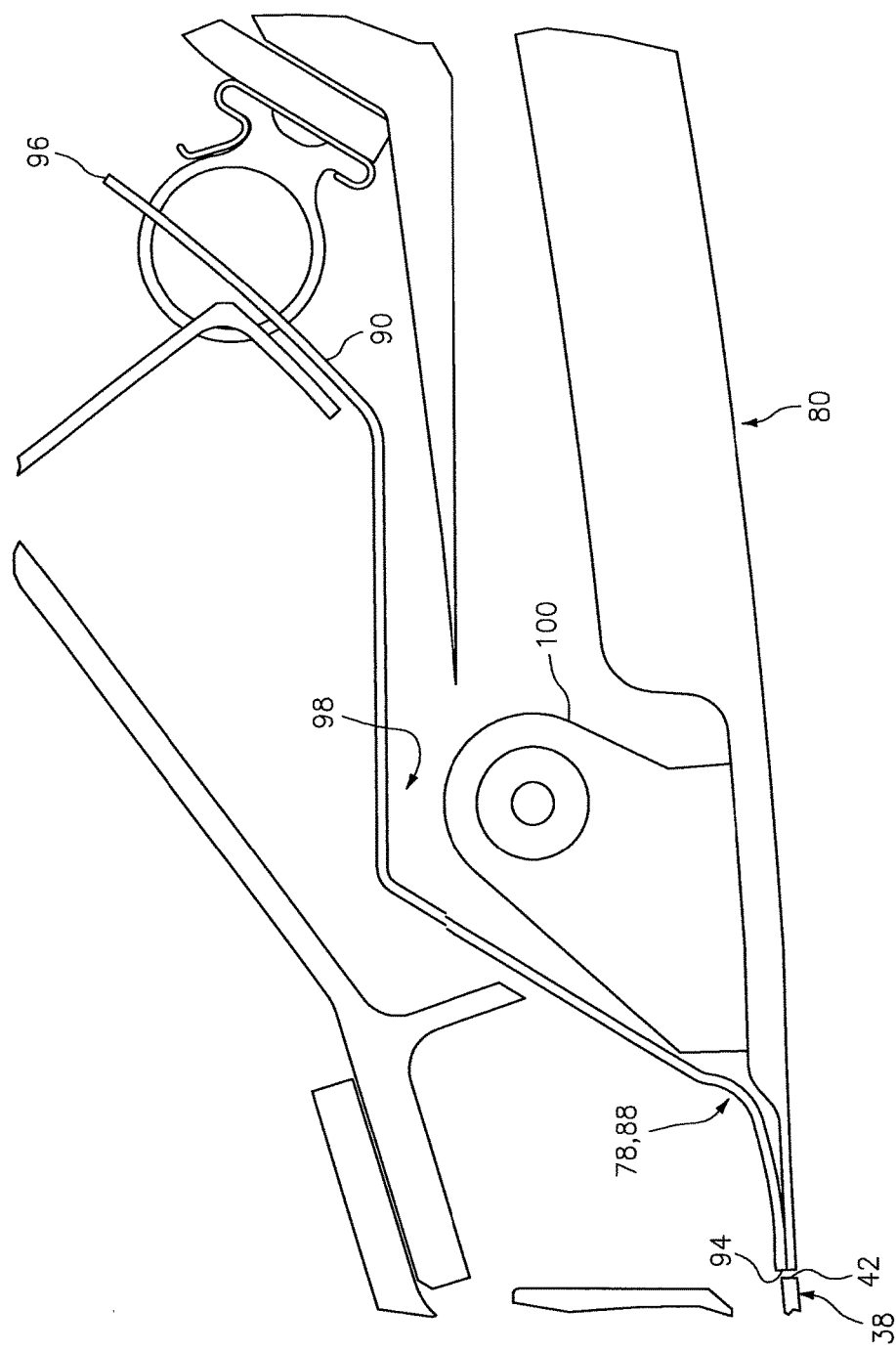
FIG. 9 is a side sectional illustration of an alternative engine nacelle where a hinge pivotally attaches its blocker door to a translating sleeve.

In the stowed position of FIG. 3, the blocker doors 80 are respectively nested in forward recess(es) of the translating sleeve 68 and may provide an outer boundary for another axial portion of the gas path 52. More particularly, the forward door ends 104 are generally axially aligned and coincident with the aft case end 42 such that the blocker doors 80 may completely axially overlap and thereby cover the fan ramp fairing 78 and its surface 90 (see also FIG. 7) as well as the forward portion of the translating sleeve 68. More particularly, forward door end 104 of the blocker door 80 of FIG. 7 is abutted axially against the aft case end 42 and thereby projects axially forward of the forward faring end 94. Of course, in other embodiments as illustrated in FIG. 9, the forward door end 104 may also be generally axially aligned and coincident with the forward faring end 94. In still other embodiments, the blocker door 80 may partially axially overlap an aft portion of the fan case 38.

During deployment of the thrust reverser 30, the translating sleeve 68 moves axially aft and thereby moves the forward door ends 104 aftward. The aft door ends 106, however, are respectively tied to the inner fairing assembly 28 by the linkages 82. The linkages 82 thereby cause the blocker doors 80 to pivot radially inward and into the deployed position of FIG. 5. In this deployed position of FIG. 5, the inner door surfaces 108 provide an aft boundary for and are operable to guide the bypass air flowing from the gas path 52 into the thrust reverser cascades 74 and the passage 72.

Figure 10:
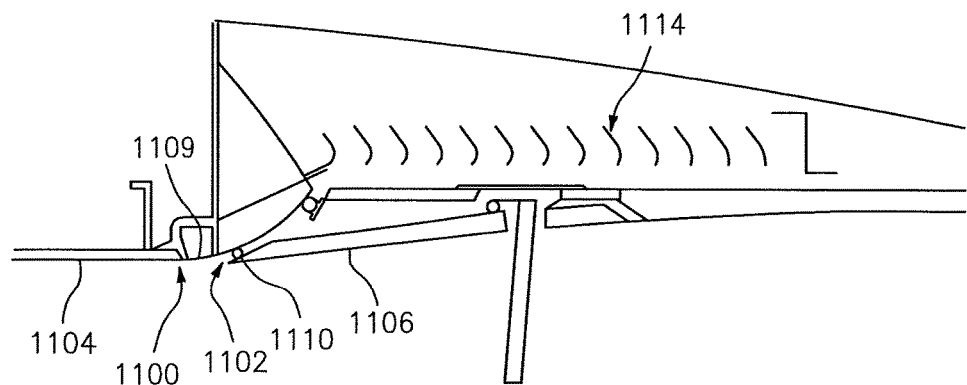
FIG. 10 is a side sectional illustration of a prior art thrust reverser system.
Figure 11:
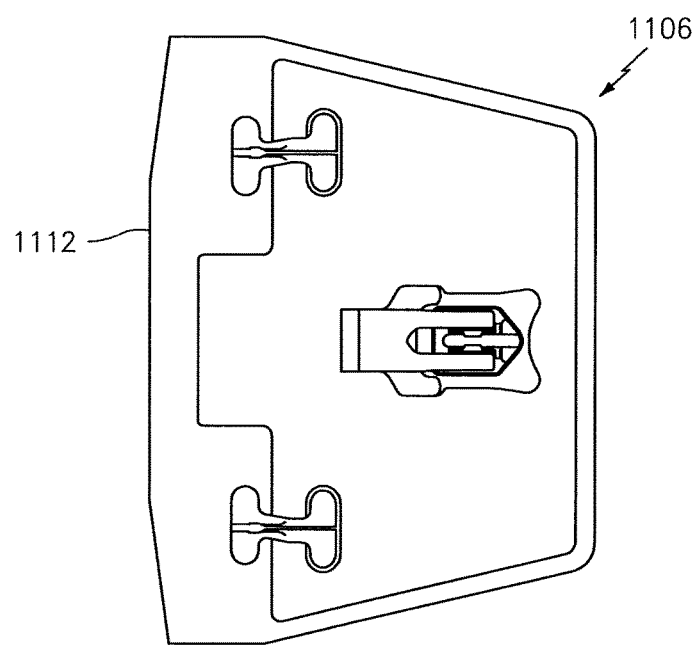
FIG. 11 is a top view illustration of a blocker door for the prior art thrust reverser system.

With the foregoing arrangements, the blocker doors 80 can reduce drag within the gas path 52 by reducing the number of inter-component seems and complying with the aerodynamically optimized outer wall design, which includes the inner surface 108 of the blocker doors 80. The reduction in drag may provide an increase in propulsion system performance during operation in the stowed position. For example, there is a single seem 112 between the fan case 38 and the blocker doors 80 in the embodiment illustrated in FIG. 7. In contrast, prior art systems typically include multiple seems 1100 and 1102 between the fan case 1104 and its blocker doors 1106 as illustrated in FIG. 10. The first seem 1100 is between the fan case 1104 and its fan ramp fairing 1108. The second seem 1102 is between the fan ramp fairing 1108 and the blocker doors 1106. This type of blocker door arrangement may also require provision of a seal 1110 between each blocker door 1106 and the fan ramp fairing 1108 as well as form an axial gap between the fan case 1104 and the blocker doors 1106. In addition, as illustrated in FIG. 11, a prior art blocker door 1106 may have a curved forward end 1112 to prevent engagement between the blocker door 1106 and a cascade 1114 (see FIG. 10) during deployment. This can be the case even for blocker door arrangements with hinges that extend into pockets of the fan ramp fairing 1108 since the hinges are still positioned a relatively large distance from the forward door end 1112. In contrast, with the arrangement of the present disclosure and with the forward position of its hinges 100, the blocker doors 80 may have a generally straight forward door end 104 as shown in FIG. 8, which enables tighter seems between the doors 80 and the fan case 38 (see FIG. 7). However, in some embodiments, one or more of the blocker doors 80 may be configured with a seal at one or more of its ends and/or sides.

The propulsion system 20 of the present disclosure may include various turbine engines other than the one described above. The propulsion system 20, for example, may include a geared turbine engine where a gear train connects one or more shafts to one or more rotors in a fan section, a compressor section and/or any other engine section. Alternatively, the propulsion system 20 may include a turbine engine configured without a gear train. The propulsion system 20 may include a geared or non-geared turbine engine configured with a single spool, with two spools, or with more than two spools. The turbine engine may be configured as a turbofan engine, a turbojet engine, a pusher fan engine or any other type of ducted turbine engine. The present disclosure therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features.

Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, the assembly comprising:
   a thrust reverser cascade extending along an axial centerline from a forward cascade end to an aft cascade end;
   a translating sleeve configured to axially translate relative to the thrust reverser cascade between an open position and a closed position;
   a fan ramp fairing disposed at the forward cascade end, the fan ramp fairing comprising a fan ramp fairing body,
      the fan ramp fairing configured with a fairing surface that provides a forward boundary for bypass air flowing into the thrust reverser cascade during a first mode of operation, wherein the translating sleeve is in the open position, and
      the fairing surface extending axially from an aftmost end to a forwardmost distal end of the fan ramp fairing body;
   a blocker door comprising a first end and a second end,
      the first end configured to completely axially overlap the fairing surface during a second mode of operation, wherein the translating sleeve is in the closed position;
   a first hinge mounted on the first end of the blocker door that pivotally attaches the blocker door to the translating sleeve,
      wherein the first hinge projects into a pocket formed in the fan ramp fairing surface between the aftmost end and the forwardmost distal end; and
   a second hinge mounted on the second end of the blocker door that pivotally attaches the blocker door to an inner fixed structure disposed coaxially along the centerline and radially inward of the fan ramp fairing;
   wherein the forwardmost distal end of the fan ramp fairing is fixed in the same location when the blocker door is deployed and when the blocker door is stowed.

2. The assembly of claim 1, wherein the blocker door is configured to project axially forward of the fan ramp fairing during the second mode of operation.

3. The assembly of claim 1, wherein the fairing surface extends circumferentially about the centerline, and the fairing surface flares radially outward as the fan ramp fairing extends aft along the centerline.

4. The assembly of claim 1, wherein the fan ramp fairing has an arcuate sectional geometry.

5. The assembly of claim 1, further comprising a fan case extending axially to and aft case end, wherein the first end of the blocker door is substantially axially coincident with the aft case end.

6. The assembly of claim 1, further comprising a fan case, wherein the fan ramp fairing extends between the fan case and the thrust reverser cascade.

7. The assembly of claim 1, wherein the blocker door is configured to provide an aft boundary for bypass air flowing into the thrust reverser cascade during the first mode of operation.

8. An assembly for an aircraft propulsion system, the assembly comprising:
   a thrust reverser cascade extending along an axial centerline from a forward cascade end to an aft cascade end;
   a translating sleeve configured to axially translate relative to the thrust reverser cascade between a deployed position and a stowed position;
   a fan ramp fairing disposed at the forward cascade end,
      the fan ramp fairing configured to provide a forward boundary for air flowing into the thrust reverser cascade when the translating sleeve is in the deployed position, and
      the fan ramp faring comprises a discrete body that extends axially from a forwardmost edge to an aftmost edge;
   a blocker door comprising a first end and a second end,
      the first end configured to completely axially cover the fan ramp fairing when the translating sleeve is in the stowed position;
   a first hinge mounted on the first end of the blocker door that pivotally attaches the blocker door to the translating sleeve,
      wherein the first hinge projects into a pocket formed in the fan ramp fairing between the forwardmost edge and the aftmost edge; and
   a second hinge mounted on the second end of the blocker door that pivotally attaches the blocker door to an inner fixed structure disposed coaxially along the centerline and radially inward of the fan ramp fairing;
   wherein the forwardmost edge is located at a position when the blocker door is deployed, and the forwardmost edge is located at the same position when the blocker door is stowed.

9. The assembly of claim 8, further comprising a fan case extending axially to an aft case end, wherein the first end of the blocker door is substantially axially coincident with the aft case end.

10. An assembly for an aircraft propulsion system, the assembly comprising:
    a fan case extending along an axial centerline from a forward case end to an aft case end;
    a fan cowling circumscribing and providing an aerodynamic covering for the fan case;
    a thrust reverser cascade extending axially from a forward cascade end to an aft cascade end;
    a translating sleeve configured to axially translate relative to the thrust reverser cascade between an open position and a closed position;
    a fan ramp fairing extending between the aft case end and the forward cascade end,
       wherein the fan ramp fairing and the fan case are discrete bodies, and
       the discrete body of the fan ramp fairing extends from a forwardmost edge to an aftmost edge;
    a blocker door comprising a first end and a second end,
       the first end configured to completely axially overlap the fan ramp fairing and abut against the fan case to block air flow to the thrust reverser cascade during a mode of operation, wherein the translating sleeve is in the closed position;
    a first hinge mounted on the first end of the blocker door that pivotally attaches the blocker door to the translating sleeve,
       wherein the first hinge projects into a pocket formed in the fan ramp fairing between the aftmost edge and the forwardmost edge; and
    a second hinge mounted on the second end of the blocker door that pivotally attaches the blocker door to an inner fixed structure disposed coaxially along the centerline and radially inward of the fan ramp fairing;

wherein the fan ramp fairing has a sectional geometry when the blocker door is deployed, and the fan ramp fairing has the sectional geometry when the blocker door is stowed.

11. The assembly of claim 10, wherein the first end of the blocker door is substantially axially coincident with the aft case end during the mode of operation.

12. The assembly of claim 10, wherein the blocker door is configured to completely axially cover a fairing surface of the fan ramp fairing during the mode of operation, and the fairing surface is configured to provide a forward boundary for bypass air flowing into the thrust reverser cascade during another mode of operation.

* * * * *

UNITED STATES PATENT AND TRADEMARK OFFICE
CERTIFICATE OF CORRECTION

PATENT NO. : 10,184,426 B2
APPLICATION NO. : 14/746380
DATED : January 22, 2019
INVENTOR(S) : Johann S. Screll Page 1 of 1

It is certified that error appears in the above-identified patent and that said Letters Patent is hereby corrected as shown below:

In the Specification

Column 2, Line 36, please delete "n" and insert --in--.

Column 3, Line 18, please delete "(RFD" and insert --(HPT)--.

Column 4, Line 67, please delete "fin" and insert --fan--.

In the Claims

Column 7, Line 56, In Claim 5 please delete "and aft" and insert --an aft--.

Signed and Sealed this
Twenty-sixth Day of February, 2019

Andrei Iancu
*Director of the United States Patent and Trademark Office*